United States Patent
Tanaka

(10) Patent No.: US 12,459,070 B2
(45) Date of Patent: Nov. 4, 2025

(54) MACHINE TOOL, AND CONTROL APPARATUS AND CONTROL METHOD THEREOF

(71) Applicant: DMG MORI CO., LTD., Nara (JP)

(72) Inventor: Akihiro Tanaka, Nara (JP)

(73) Assignee: DMG MORI CO., LTD., Nara (JP)

( * ) Notice: Subject to any disclaimer, the term of this patent is extended or adjusted under 35 U.S.C. 154(b) by 689 days.

(21) Appl. No.: 17/759,493

(22) PCT Filed: Jan. 5, 2021

(86) PCT No.: PCT/JP2021/000084
§ 371 (c)(1),
(2) Date: Jan. 6, 2023

(87) PCT Pub. No.: WO2021/153166
PCT Pub. Date: Aug. 5, 2021

(65) Prior Publication Data
US 2024/0217044 A1    Jul. 4, 2024

(30) Foreign Application Priority Data

Jan. 28, 2020 (JP) ................. 2020-011804

(51) Int. Cl.
*B23Q 11/10* (2006.01)
*B23Q 11/00* (2006.01)
(Continued)

(52) U.S. Cl.
CPC .......... *B23Q 11/0075* (2013.01); *B23Q 11/10* (2013.01); *B23Q 11/128* (2013.01); *G05B 19/18* (2013.01); *B23Q 11/005* (2013.01)

(58) Field of Classification Search
CPC . B23Q 11/0075; B23Q 11/10–11/1092; B23Q 11/12–11/128
See application file for complete search history.

(56) References Cited

U.S. PATENT DOCUMENTS 5,586,848 A    12/1996    Suwijn
6,123,270 A    9/2000    Hara
(Continued)

FOREIGN PATENT DOCUMENTS

CN    103796795 A    5/2014
CN    109514337 A    3/2019
(Continued)

OTHER PUBLICATIONS

Office Action dated May 12, 2023, in Chinese Patent Application No. 202180011433.5, with an English machine translation thereof, 28 pages.

(Continued)

*Primary Examiner* — Erica E Cadugan
(74) *Attorney, Agent, or Firm* — DiPerna Law Firm, P.C.; Raymond A. DiPerna

(57) ABSTRACT

To perform cleaning in a machine while meeting a user's requirement to perform machining without supplying a coolant to a work or a tool, a machine tool that performs machining for a work using a tool includes a controller that performs mode switching between a half-wet machining mode in which a coolant is supplied to a non-machining area to remove chips in the machine tool during machining, and no coolant is supplied to a machining area, and at least one (Continued)

of a wet machining mode in which the coolant is supplied to the machining area and a dry machining mode in which no coolant is not supplied into the machine tool.

4 Claims, 6 Drawing Sheets

(51) Int. Cl.
  *B23Q 11/12* (2006.01)
  *G05B 19/18* (2006.01)

(56) References Cited

U.S. PATENT DOCUMENTS

| | | | |
|---|---|---|---|
| 6,206,621 | B1 | 3/2001 | Sebring |
| 9,383,147 | B2 | 7/2016 | Kono et al. |
| 11,273,531 | B2* | 3/2022 | Skrna ............... B23Q 11/1038 |
| 2014/0338765 | A1* | 11/2014 | Kono .................... B23Q 11/10 137/565.16 |
| 2018/0272488 | A1 | 9/2018 | Matsuyama et al. |

FOREIGN PATENT DOCUMENTS

| | | |
|---|---|---|
| JP | S 58-044111 U | 3/1983 |
| JP | H08-47839 A | 2/1996 |
| JP | H10-180585 A | 7/1998 |
| JP | H11-504866 A | 5/1999 |
| JP | 2000-084790 A | 3/2000 |
| JP | 2002-066871 A | 3/2002 |
| JP | 2002-103133 A | 4/2002 |
| JP | 2002-129176 A | 5/2002 |
| JP | 2002-524278 A | 8/2002 |
| JP | 2003-019637 A | 1/2003 |
| JP | 2003-089036 A | 3/2003 |
| JP | 2005-335015 A | 12/2005 |
| JP | 2007-152489 A | 6/2007 |
| JP | 2008-213099 A | 9/2008 |
| JP | 2016-068223 A | 5/2016 |
| JP | 2019-141953 A | 8/2019 |
| JP | 2020-006462 A | 1/2020 |

OTHER PUBLICATIONS

Extended European Search Report dated Jun. 20, 2023, in European Patent Application No. 21748347.8, 7 pages.
Office Action issued on Nov. 24, 2023 in connection with Chinese Patent Application No. 202180011433.5 and English machine translation thereof, 24 pages.
"Mechanical Manufacturing Technical Foundations", luvouch, Docking Oscillation, Chinese Science and Technology Press, May 2006, pp. 63-64.
English Abstract of JP S 58-44111U, 3 pages.
English Abstract of JP H 08-47839A, 1 page.
English Abstract of JP H 10-180585A, 1 page.
English Abstract of JP H 11-504866A, 1 page.
English Abstract of JP 2000-084790A, 1 page.
English Abstract of JP 2002-066871A, 1 page.
English Abstract of JP 2002-103133A, 1 page.
English Abstract of JP 2002-129176A, 1 page.
English Abstract of JP 2002-524278A, 1 page.
English Abstract of JP 2003-019637A, 1 page.
English Abstract of JP 2003-089036A, 1 page.
English Abstract of JP 2005-335015A, 1 page.
English Abstract of JP 2007-152489A, 1 page.
English Abstract of JP 2008-213099A, 1 page.
English Abstract of JP 2016-068223A, 1 page.
English Abstract of JP 2019-141953A, 1 page.
English Abstract of JP 2020-006462A, 1 page.
Notice of Reasons for Refusal mailed May 7, 2020 in Japanese Patent Application No. 2020-011804, with English translation, 13 pages.
Decision to Grant a Patent mailed Oct. 6, 2020 in Japanese Patent Application No. 2020-011804, with English translation, 5 pages.
International Search Report and Written Opinion mailed Mar. 30, 2021 in PCT/JP2021/000084, with partial English translation, 12 pages.

* cited by examiner

[WET MACHINING MODE] → SUPPLY COOLANT TO NON-MACHINING AREA AND MACHINING AREA

<PROGRAM EXAMPLE>

M80,          214
M200,         : CEILING SHOWER (APC SIDE + SPINDLE SIDE) ON
S5000 M03 G01 X100 Y100 F2000,   : CONVEYOR FORWARD ROTATION (BASE COOLANT ON)
              : SPINDLE5000min-1 FEED2000mm/min MACHINE BY CUTTING FEED

[HALF-WET MACHINING MODE] → SUPPLY COOLANT TO NON-MACHINING AREA BUT NOT TO MACHINING AREA DURING MACHINING

<PROGRAM EXAMPLE>

M100,         214
M200,         : CEILING SHOWER (APC SIDE) ON
S5000 M03 G01 X100 Y100 F2000,   : CONVEYOR FORWARD ROTATION (BASE COOLANT ON)
              : SPINDLE5000min-1 FEED2000mm/min MACHINE BY CUTTING FEED

[DRY MACHINING MODE] → SUPPLY NO COOLANT OTHER THAN BASE COOLANT DURING MACHINING

<PROGRAM EXAMPLE>

M200,         214
S5000 M03 G01 X100 Y100 F2000,   : CONVEYOR FORWARD ROTATION (BASE COOLANT ON)
              : SPINDLE5000min-1 FEED2000mm/min MACHINE BY CUTTING FEED

FIG. 3

MACHINE TOOL, AND CONTROL APPARATUS AND CONTROL METHOD THEREOF

CROSS-REFERENCE TO RELATED APPLICATIONS

This application is a National Phase application under 35 U.S.C. § 371 of PCT Application No. PCT/JP2021/000084, filed Jan. 5, 2021, which application is based upon and claims the benefit of priority from Japanese patent application No. 2020-011804, filed on Jan. 28, 2020, the disclosures of which are incorporated herein in their entirety by reference.

TECHNICAL FIELD

The present invention relates to a machine tool, and a control apparatus and a control method thereof.

BACKGROUND ART

In the above technical field, patent literature 1 discloses a machine tool including a machining coolant supply path that supplies a coolant to a machining area by a tool, and a tool connecting portion cleaning coolant supply path that supplies a coolant to a connecting portion area between a spline and a tool at the time of tool exchange.

CITATION LIST

Patent Literature

Patent literature 1: Japanese Patent Laid-Open No. 2007-152489

SUMMARY OF THE INVENTION

Technical Problem

However, the technique described in the above literature uses control for always supplying the coolant to the machining area in machining. It is therefore impossible to meet a user's requirement that dry machining is performed without supplying a coolant to a work or tool, thereby reducing temperature variations in the tool and improving the tool life. On the other hand, if only control is performed not to supply a coolant, the driving load on the driving shaft may be excessive due to chips generated by machining, and the machine may stop with an alarm.

The present invention enables to provide a technique of solving the above-described problem.

Solution to Problem

One example aspect of the invention provides a machine tool that performs machining for a work using a tool, comprising
   a controller that performs mode switching between
   a half-wet machining mode in which, in addition to a base coolant, a coolant is supplied to a non-machining area to remove chips in the machine tool during machining, and no coolant is supplied to a machining area, and
   at least one of a wet machining mode in which the coolant is supplied to the machining area and a dry machining mode in which a coolant other than the base coolant is not supplied into the machine tool.

Another example aspect of the invention provides a control apparatus of a machine tool that performs machining for a work using a tool, wherein the control apparatus performs mode switching between
   a half-wet machining mode in which a coolant is supplied to a non-machining area to remove chips in the machine tool during machining, and no coolant is supplied to a machining area, and
   at least one of a wet machining mode in which the coolant is supplied to the machining area and a dry machining mode in which no coolant is supplied into the machine tool.

Still other example aspect of the invention provides a control method of a machine tool that performs machining for a work using a tool, comprising
   performing mode switching between
   a half-wet machining mode in which a coolant is supplied to a non-machining area to remove chips in the machine tool during machining, and no coolant is supplied to a machining area, and
   at least one of a wet machining mode in which the coolant is supplied to the machining area and a dry machining mode in which no coolant is supplied into the machine tool.

Advantageous Effects of Invention

According to the present invention, it is possible to perform cleaning in the machine while meeting the user's requirement to perform machining without supplying a coolant to a work or a tool.

BRIEF DESCRIPTION OF DRAWINGS

FIG. 3 is a view showing an example of the machining program of the machine tool according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
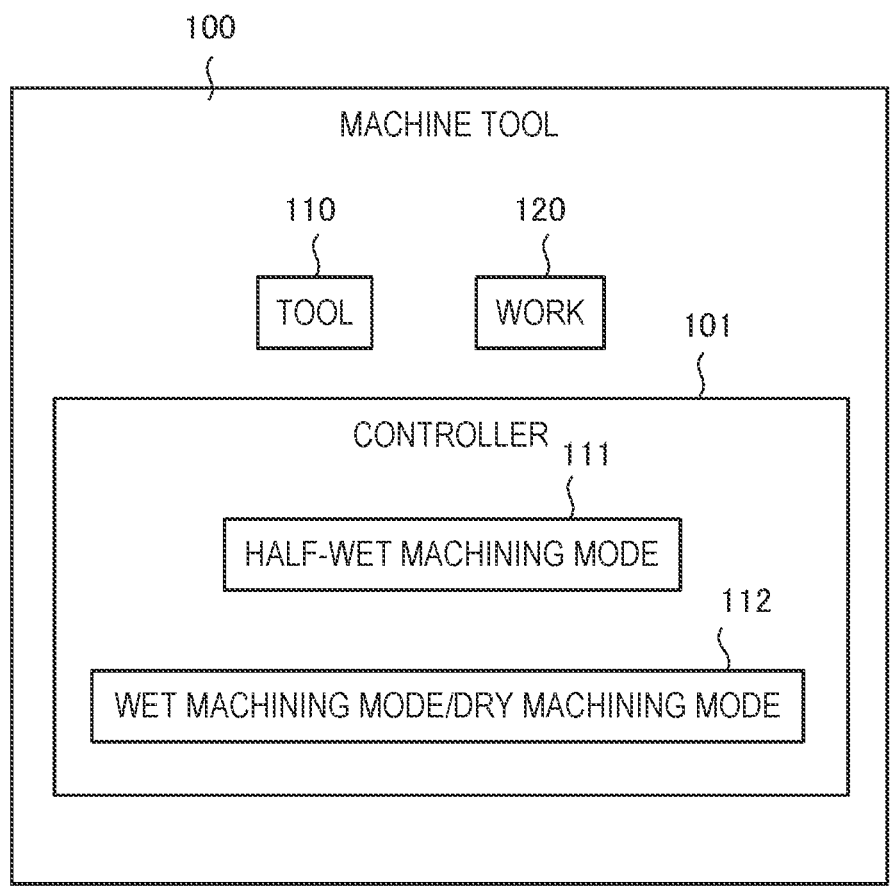
FIG. 1 is a block diagram showing the functional configuration of a machine tool according to the first example embodiment of the present invention.

A machine tool 100 according to the first example embodiment of the present invention will be described with reference to FIG. 1. As shown in FIG. 1, the machine tool 100 performs machining of a work 120 using a tool 110, and includes a controller 101 that controls coolant supply.

The controller 101 performs mode switching between a half-wet machining mode 111 and a machining mode 112 that is at least one of a wet machining mode and a dry machining mode. The half-wet machining mode 111 is a mode in which a coolant is supplied to remove chips in the machine tool during machining, and no coolant is supplied to a machining area. The wet machining mode is a mode in which a coolant is supplied to a machining area during machining. The dry machining mode is a mode in which no coolant is supplied into the machine tool during machining.

With the above-described configuration, even in the dry machining mode, chips in the machine tool can be cleaned by the coolant, and switching with another mode can be performed.

Second Example Embodiment

Figure 2:
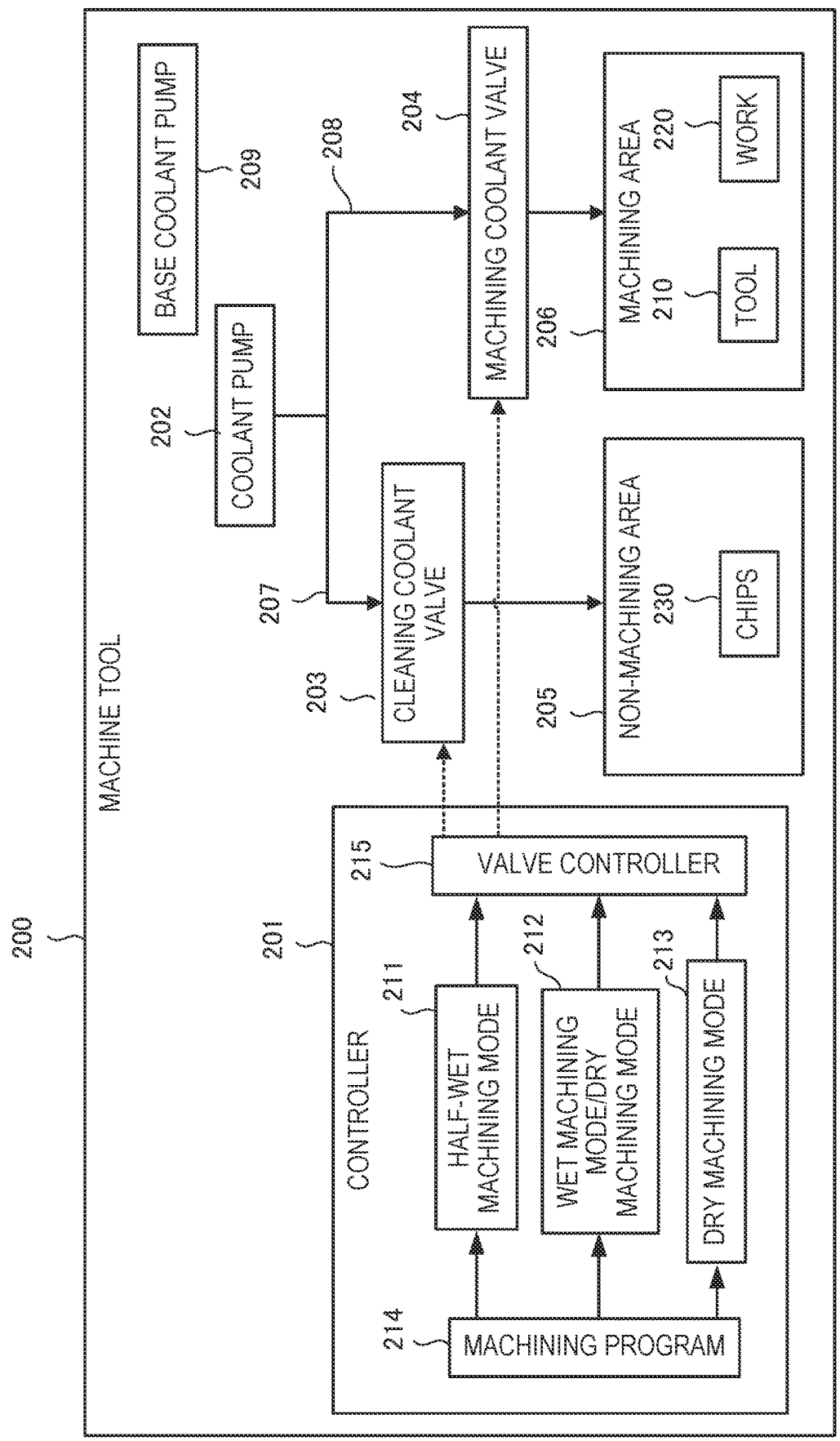
FIG. 2 is a block diagram showing the functional configuration of a machine tool according to the second example embodiment of the present invention.

A machine tool 200 according to the second example embodiment of the present invention will be described next with reference to FIG. 2. FIG. 2 is a block diagram for explaining the functional configuration of the machine tool 200 according to this example embodiment.

The machine tool 200 is an apparatus for machining a work 220 using a tool 210. The machine tool 200 includes a coolant pump 202 that supplies a coolant to cool the tool 210 or the work 220 or remove chips 230, and a controller 201 that controls the supply of the coolant. In addition, the machine tool 200 also separately includes a base coolant pump 209 configured to supply a base coolant to the floor. Note that FIG. 2 shows two types of coolant pumps. However, coolant pumps may be provided in accordance with the use purpose of coolants (a spindle coolant, a through-spindle coolant, a shower coolant, a base coolant, and the like).

The controller 201 performs mode switching between a half-wet machining mode 211, a wet machining mode 212, and a dry machining mode 213, and a valve controller 215 controls valves. The half-wet machining mode 211 is a mode in which a coolant is supplied to a non-machining area 205 to remove the chips 230 in the machine tool 200 during machining, and no coolant is supplied to a machining area 206. The non-machining area is, for example, an area on an APC (Automatic Pallet Changer) side. The wet machining mode 212 is a mode in which a coolant is supplied to the machining area 206 during machining. The dry machining mode 213 is a mode in which no coolant is supplied into the machine tool 200 during machining.

In the wet machining mode 212, the coolant is supplied to the machining area during machining, thereby suppressing an increase of the temperature of the tool 210 or the work 220. The dry machining mode 213 is a mode to be used by a user who wants to suppress the use amount of the coolant while prolonging the life of the tool 210 by stopping the supply of the coolant into the machine tool 200 to make the temperature change of the tool 210 moderate during machining. The half-wet machining mode 211 is a mode to be used by a user who wants to supply the coolant to remove the chips 230 in the machine tool 200 during machining but not to supply the coolant to the machining area 206 to prolong the life of the tool 210.

There are provided two types of coolant supply paths from the coolant pump 202. These are a supply path 207 for non-machining area, which supplies the coolant from the coolant pump 202 to the non-machining area 205, and a supply path 208 for machining area, which supplies the coolant to the machining area 206. The supply paths are provided with a cleaning coolant valve 203 and a machining coolant valve 204, respectively.

The valve controller 215 opens both the cleaning coolant valve 203 and the machining coolant valve 204 in the wet machining mode 212, and closes both the cleaning coolant valve 203 and the machining coolant valve 204 in the dry machining mode 213. In the half-wet machining mode 211, the valve controller 215 closes the machining coolant valve 204 and opens the cleaning coolant valve 203.

More specifically, the controller 201 is an NC machine (Numerical Control Machine), and executes a machining program 214 that is an NC program described by the user. Mode switching between the half-wet machining mode 211, the wet machining mode 212, and the dry machining mode 213 is thus performed. More specifically, M codes (Machine codes) corresponding to the above-described three modes are prepared in advance, and these M codes (for example, M90: Wet Mode, M91: Dry Mode, and M92: Half Wet Mode) are designated, thereby controlling the valves. That is, the controller 201 performs control based on the code of the machining program prepared in advance for at least one of the half-wet machining mode 211, the wet machining mode 212, and the dry machining mode 213. FIG. 3 shows an example of the machining program 214. In FIG. 3, "ceiling shower" means supplying the coolant from a plurality of nozzles on the ceiling to the machining area or the non-machining area, like shower.

Figure 4:
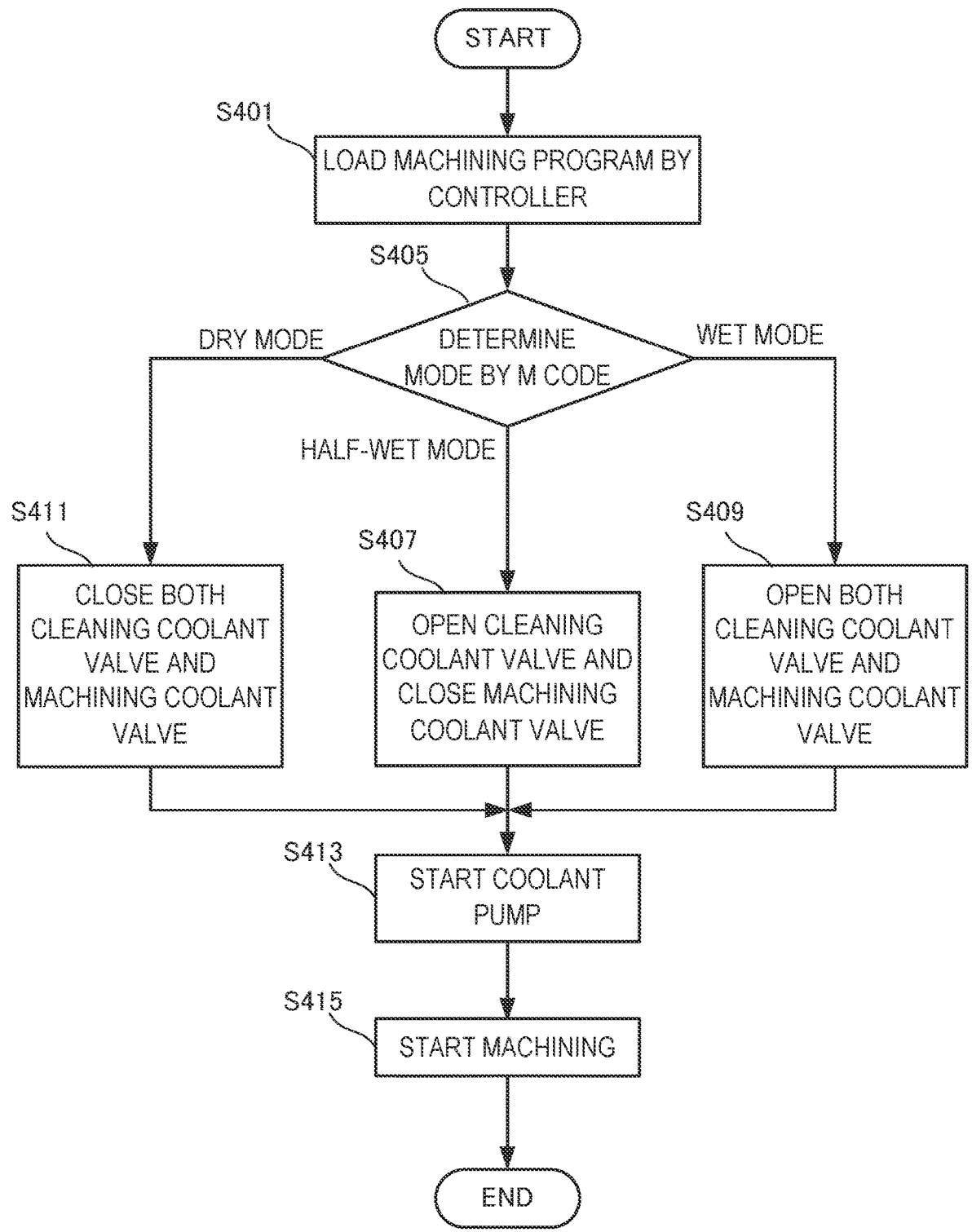
FIG. 4 is a flowchart showing the procedure of processing of the machine tool according to the second example embodiment of the present invention.

FIG. 4 is a flowchart showing a control method by the controller 201. First, in step S401, the controller 201 (NC machine) loads the machining program 214. Next, in step S405, the M code in the machining program 214 is loaded, and it is determined which one of the half-wet machining mode 211, the wet machining mode 212, and the dry machining mode 213 is selected as the mode for supplying the coolant. As a result, if the wet machining mode 212 is selected, the process advances to step S409 to open both the cleaning coolant valve 203 and the machining coolant valve 204. If the dry machining mode 213 is selected, the process advances to step S411 to close both the cleaning coolant valve 203 and the machining coolant valve 204. If the half-wet machining mode 211 is selected, the process advances to step S407 to open the cleaning coolant valve 203 and close the machining coolant valve 204.

Then, the process advances to step S413 to start the coolant pump 202. Also, in step S415, the tool 210 and the work 220 are driven in accordance with the machining program, thereby starting machining.

As described above, according to this example embodiment, the chips 230 in the non-machining area can be removed without supplying the coolant to the machining area. When machining itself is performed as dry machining, and the coolant is supplied to a portion where the chips can be removed without applying the coolant to the work, the chips can be removed at an appropriate timing. More specifically, supply to the machining point+supply to other structures, supply only to the machining point, or supply only to walls and other structures is selected by the M code on the program, the channel is switched based on the selection result, and the supply destination of the coolant can be switched in accordance with machining.

Note that in this example embodiment, switching between three modes, that is, the half-wet machining mode, the wet machining mode, and the dry machining mode has been described. However, the controller may perform switching between only two modes, that is, the half-wet machining mode and the wet machining mode. Alternatively, the controller may perform switching between only two modes, that is, the half-wet machining mode and the dry machining mode. Also, the machine tool 200 may include a camera (not shown), and in the half-wet machining mode 211, control may be performed to supply the coolant when the chips 230 are detected by the camera.

Third Example Embodiment

Figure 5:
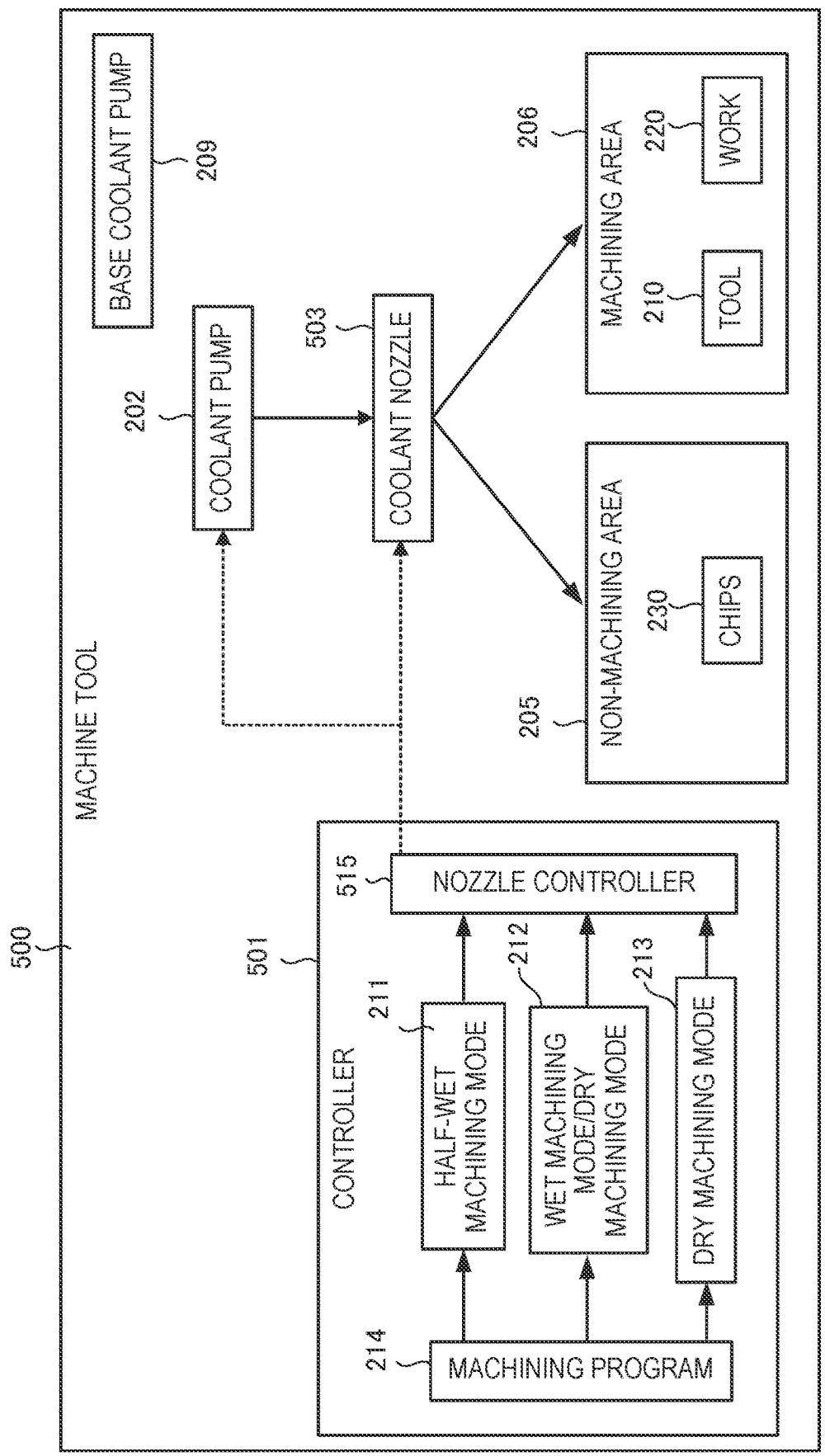
FIG. 5 is a block diagram showing the functional configuration of a machine tool according to the third example embodiment of the present invention.

A machine tool 500 according to the third example embodiment of the present invention will be described next with reference to FIG. 5. FIG. 5 is a view for explaining the functional configuration of the machine tool 500 according to this example embodiment. The machine tool 500 according to this example embodiment is different from the second example embodiment in that the machine tool includes a coolant nozzle 503 capable of changing the ejection direction of a coolant when the coolant from a coolant pump 202 is ejected into the machine tool 500. Also different is that a controller 501 includes a nozzle controller 515 that controls the coolant nozzle 503. The rest of the components and operations is the same as in the second example embodiment. Hence, the same reference numerals denote the same components and operations, and a detailed description thereof will be omitted.

The nozzle controller 515 of the controller 501 controls the coolant nozzle 503, thereby ejecting the coolant to both a non-machining area 205 and a machining area 206 in a wet machining mode 212. Additionally, the nozzle controller 515 controls the coolant pump 202, thereby supplying no coolant to either the machining area 206 or the non-machining area 205 in a dry machining mode 213. That is, in the dry machining mode 213, the coolant pump 202 is stopped. In a half-wet machining mode 211, the controller 501 controls the direction of the coolant nozzle 503 such that the coolant is ejected to the non-machining area 205 to remove chips 230 but not to the machining area 206.

As described above, according to this example embodiment, the chips 230 in the non-machining area can be removed without supplying the coolant to the machining area.

Fourth Example Embodiment

Figure 6:
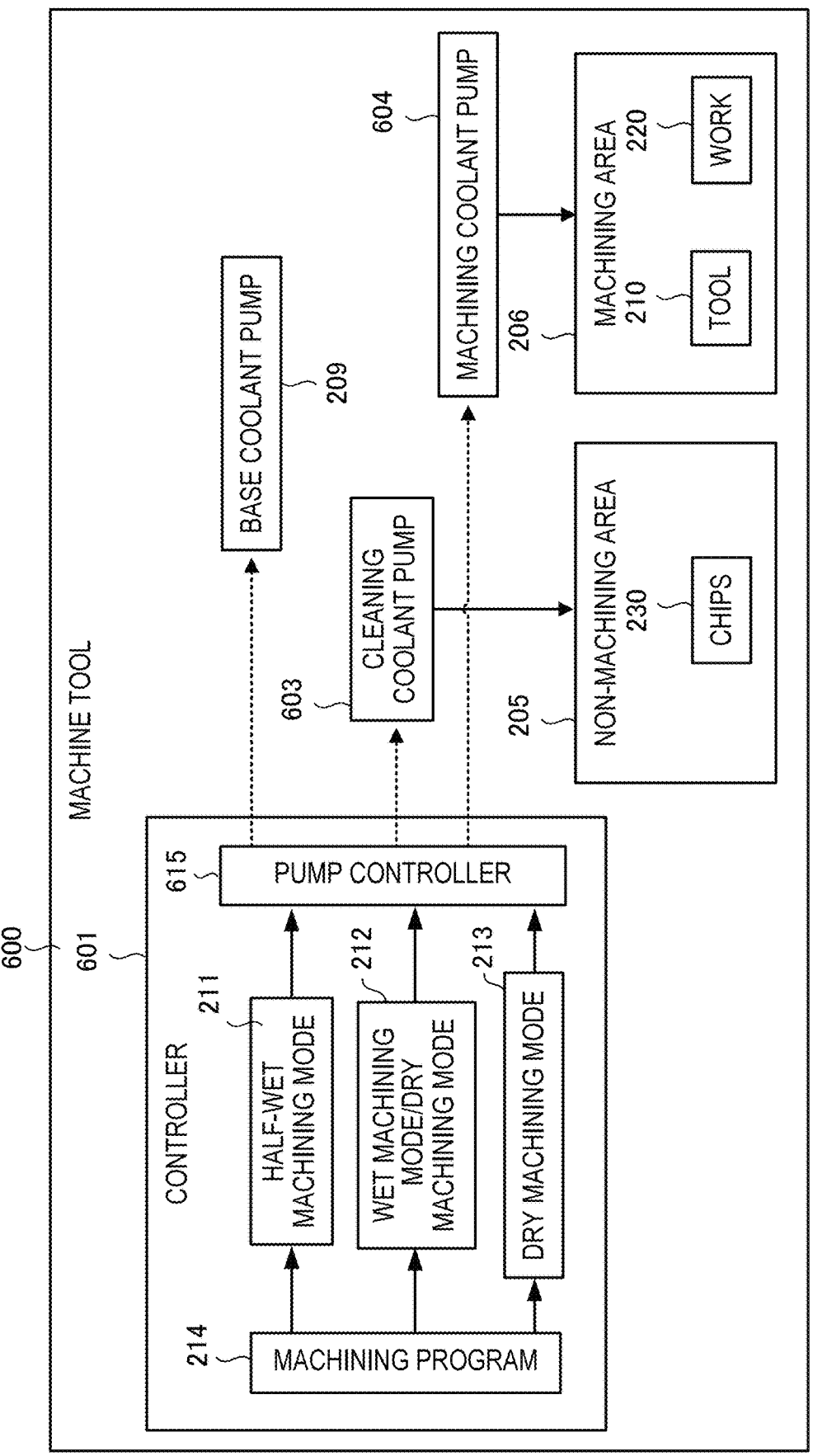
FIG. 6 is a block diagram showing the functional configuration of a machine tool according to the fourth example embodiment of the present invention.

A machine tool 600 according to the fourth example embodiment of the present invention will be described next with reference to FIG. 6. FIG. 6 is a view for explaining the functional configuration of the machine tool 600 according to this example embodiment. The machine tool 600 according to this example embodiment is different from the second example embodiment in that the machine tool includes a cleaning coolant pump 603 that supplies a coolant to a non-machining area, and a machining coolant pump 604 that supplies a coolant to a machining area. Also different is that a controller 601 includes a pump controller 615 that controls the pumps. The rest of the components and operations is the same as in the second example embodiment. Hence, the same reference numerals denote the same components and operations, and a detailed description thereof will be omitted.

In a half-wet machining mode, the pump controller 615 turns off the machining coolant pump 604, and turns on a base coolant pump 209 and the cleaning coolant pump 603. In a wet machining mode, the pump controller 615 turns on the base coolant pump 209, the machining coolant pump 604, and the cleaning coolant pump 603. In a dry machining mode, the pump controller 615 controls the pumps to turn on the base coolant pump 209 and turn off the machining coolant pump 604 and the cleaning coolant pump 603.

This can obtain the same effects as in the second example embodiment.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute steps S401 to S413 included in the above-described example embodiments.

This application is based upon and claims the benefit of priority from Japanese patent application No. 2020-011804, filed on Jan. 28, 2020, the disclosure of which is incorporated herein in its entirety by reference.

The invention claimed is:

1. A machine tool that performs machining of a work using a tool, the machine tool comprising
   a base coolant pump;
   a machining coolant pump that supplies coolant from the machining coolant pump to a machining area in which the machining is carried out;
   a cleaning coolant pump that supplies the coolant from the cleaning coolant pump to a non-machining area; and
   a controller that performs mode switching between
   a half-wet machining mode in which, in addition to a base coolant being supplied by the base coolant pump, a coolant is supplied to the non-machining area to remove chips from the machine tool during the machining, and no coolant is supplied to the machining area, and
   at least one of a wet machining mode in which the coolant is supplied to the machining area and a dry machining mode in which no coolant other than the base coolant is supplied into the machine tool, and
   wherein said controller controls the pumps to turn off said machining coolant pump and turn on said base coolant pump and said cleaning coolant pump in the half-wet machining mode, turn on said base coolant pump, said machining coolant pump, and said cleaning coolant pump in the wet machining mode, and turn on said base coolant pump and turn off said machining coolant pump and said cleaning coolant pump in the dry machining mode.

2. The machine tool according to claim 1, wherein said controller performs control based on a code of a machining program prepared in advance for at least one of the half-wet machining mode, the wet machining mode, and the dry machining mode.

3. A control apparatus of a machine tool that performs machining of a work using a tool,
wherein the machine tool comprises:
a base coolant pump;
a machining coolant pump that supplies coolant from the machining coolant pump to a machining area in which the machining is carried out; and
a cleaning coolant pump that supplies the coolant from the cleaning coolant pump to a non-machining area;
wherein the control apparatus performs mode switching between
a half-wet machining mode in which a coolant is supplied to the non-machining area to remove chips from the machine tool during the machining, and no coolant is supplied to the machining area, and
at least one of a wet machining mode in which the coolant is supplied to the machining area and a dry machining mode in which no coolant is supplied into the machine tool except for base coolant that is supplied to the machine tool via the base coolant pump, and
wherein the control apparatus controls the pumps to turn off said machining coolant pump and turn on said base coolant pump and said cleaning coolant pump in the half-wet machining mode, turn on said base coolant pump, said machining coolant pump, and said cleaning coolant pump in the wet machining mode, and turn on said base coolant pump and turn off said machining coolant pump and said cleaning coolant pump in the dry machining mode.

4. A control method of a machine tool that performs machining of a work using a tool, which machine tool comprises:
a base coolant pump;
a machining coolant pump that supplies coolant from the machining coolant pump to a machining area in which the machining is carried out; and
a cleaning coolant pump that supplies the coolant from the cleaning coolant pump to a non-machining area,
the control method comprising
performing mode switching between
a half-wet machining mode in which a coolant is supplied to the non-machining area to remove chips from the machine tool during the machining, and no coolant is supplied to the machining area, and
at least one of a wet machining mode in which the coolant is supplied to the machining area and a dry machining mode in which no coolant is supplied into the machine tool except for base coolant that is supplied to the machine tool via the base coolant pump,
wherein the pumps are controlled to turn off said machining coolant pump and turn on said base coolant pump and said cleaning coolant pump in the half-wet machining mode, turn on said base coolant pump, said machining coolant pump, and said cleaning coolant pump in the wet machining mode, and turn on said base coolant pump and turn off said machining coolant pump and said cleaning coolant pump in the dry machining mode.

* * * * *